United States Patent
Yokoyama et al.

(10) Patent No.: US 6,375,329 B1
(45) Date of Patent: Apr. 23, 2002

(54) PROJECTOR AND METHOD OF MANUFACTURING A LIGHT MODULATION DEVICE

(75) Inventors: Osamu Yokoyama, Shiojiri; Tatsuya Shimoda, Nagano-ken; Satoru Miyashita, Chino, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/202,133
(22) PCT Filed: Apr. 17, 1998
(86) PCT No.: PCT/JP98/01787
§ 371 Date: Dec. 8, 1998
§ 102(e) Date: Dec. 8, 1998

(30) Foreign Application Priority Data

Nov. 13, 1996 (JP) .............................................. 8-302215

(51) Int. Cl.[7] .............................................. G03B 21/00
(52) U.S. Cl. ....................................................... 353/31
(58) Field of Search .............................. 359/295, 315; 349/25, 89, 114; 216/13; 257/431, 432; 430/347, 495.1; 353/31

(56) References Cited

U.S. PATENT DOCUMENTS

| 3,701,586 A | | 10/1972 | Goetz |
| 4,441,791 A | | 4/1984 | Hornbeck |
| 5,258,236 A | * | 11/1993 | Arjavalingam et al. ..... 428/626 |
| 5,401,983 A | * | 3/1995 | Jokerst et al. ................. 257/82 |
| 5,435,876 A | * | 7/1995 | Alfaro et al. ................ 156/247 |
| 5,579,179 A | | 11/1996 | Ji et al. |
| 5,581,393 A | | 12/1996 | Min |
| 5,867,202 A | * | 2/1999 | Knipe et al. ................. 347/239 |

FOREIGN PATENT DOCUMENTS

| EP | 0 743 541 A1 | 3/1996 |
| JP | 6-89473 | 9/1994 |
| JP | A-6-301066 | 10/1994 |

OTHER PUBLICATIONS

"Segmented Bimorph Deformable Mirror" by F. Forbes et al., *Jornal of Physics E. Scientific Instruments*, IOP Publishing, Bristol, G.B., vol. 22, No. 6, Jun. 1989.

* cited by examiner

Primary Examiner—Safet Metjahic
Assistant Examiner—Etienne LeRoux
(74) Attorney, Agent, or Firm—Oliff & Berridge, PLC

(57) ABSTRACT

There is provided a method of manufacturing a light modulation device that does not produce scattered reflection comprising: a step of forming a release layer whereby a release layer that produces separation in response to irradiation with incoming light is formed on a heat-resistant substrate having the capability of withstanding heat; a step of forming a piezoelectric layer whereby a piezoelectric layer is formed on the release layer; a patterning step whereby an electrode pattern is formed in respect of the piezoelectric layer and mirror elements are formed at each pixel; a connection step of electrically connecting the active element substrate wherein active elementary elements are provided for each pixel and the piezoelectric layer laminated on the heat-resistant substrate such that the active elements correspond to mirror elements; and an irradiating separation step whereby separation is produced in the release layer by irradiating the release layer with irradiating light from the side of the heat-resistant substrate.

13 Claims, 7 Drawing Sheets

FIG.1A FORMATION OF RELEASE LAYER
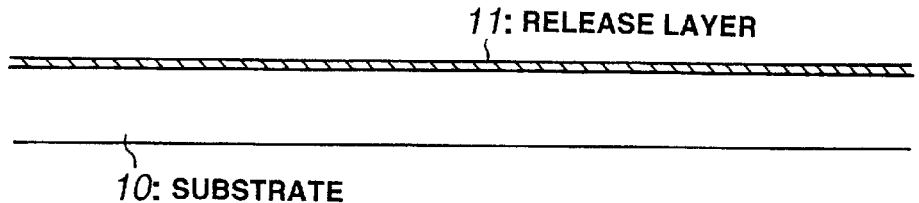
FIG.1B FORMATION OF PIEZOELECTRIC LAYER
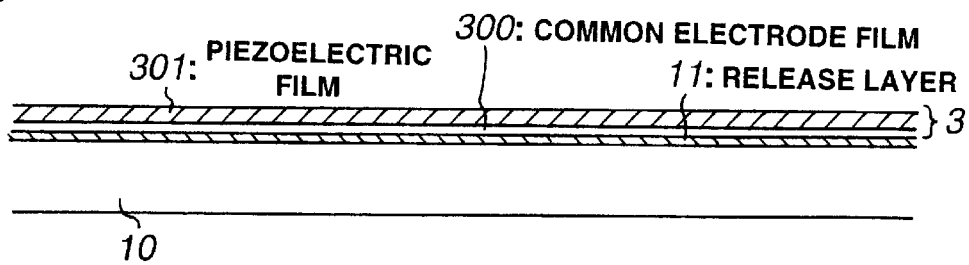
FIG.1C HEAT ANNEALING
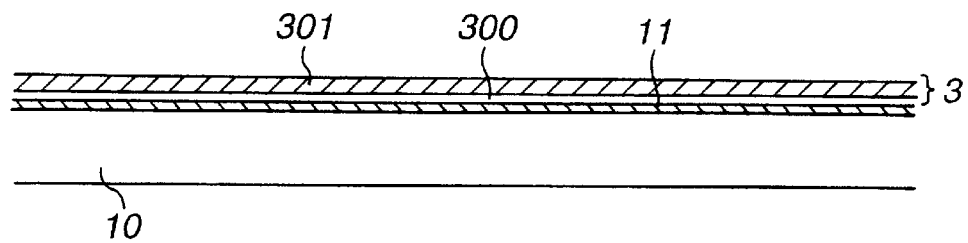
FIG.1D PATTERNING
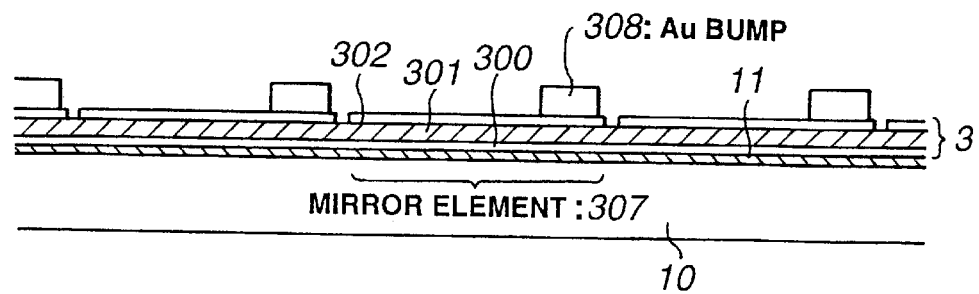

FIG.1E CONNECTION
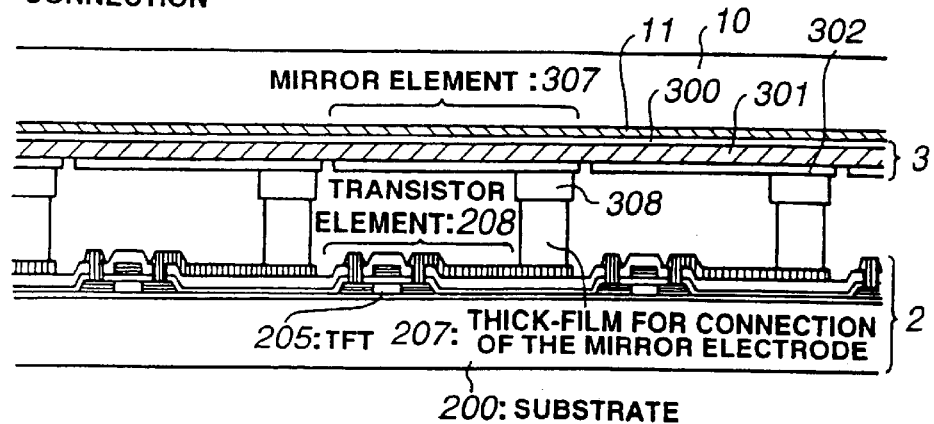
FIG.1F IRRADIATION
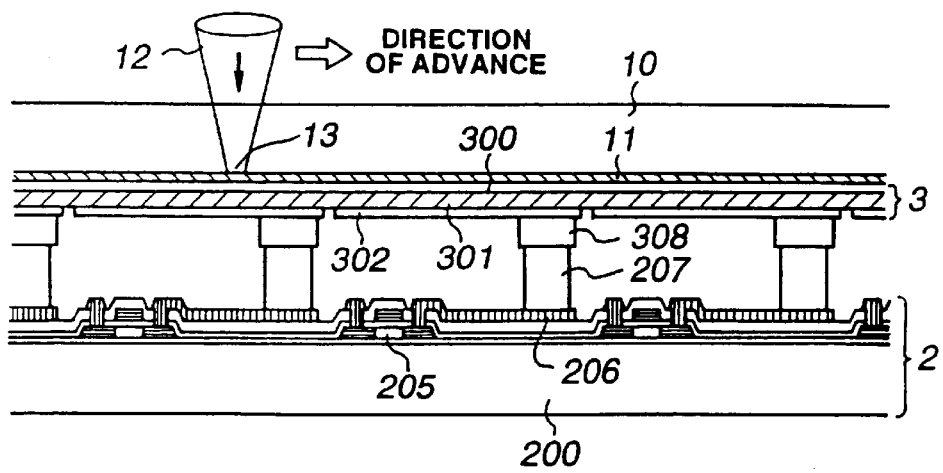
FIG.1G SEPARATION
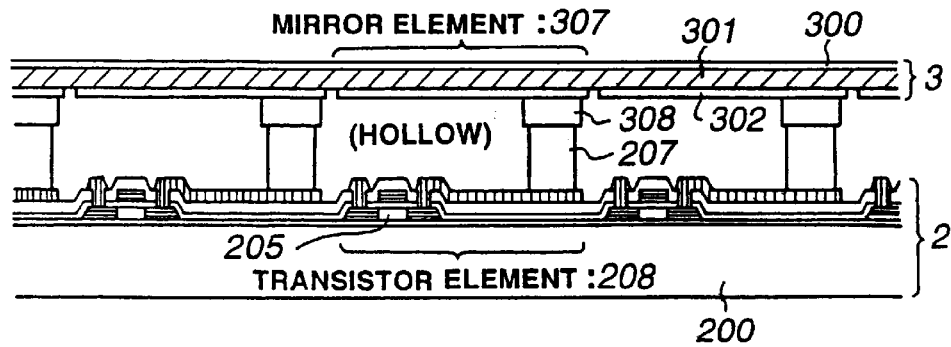

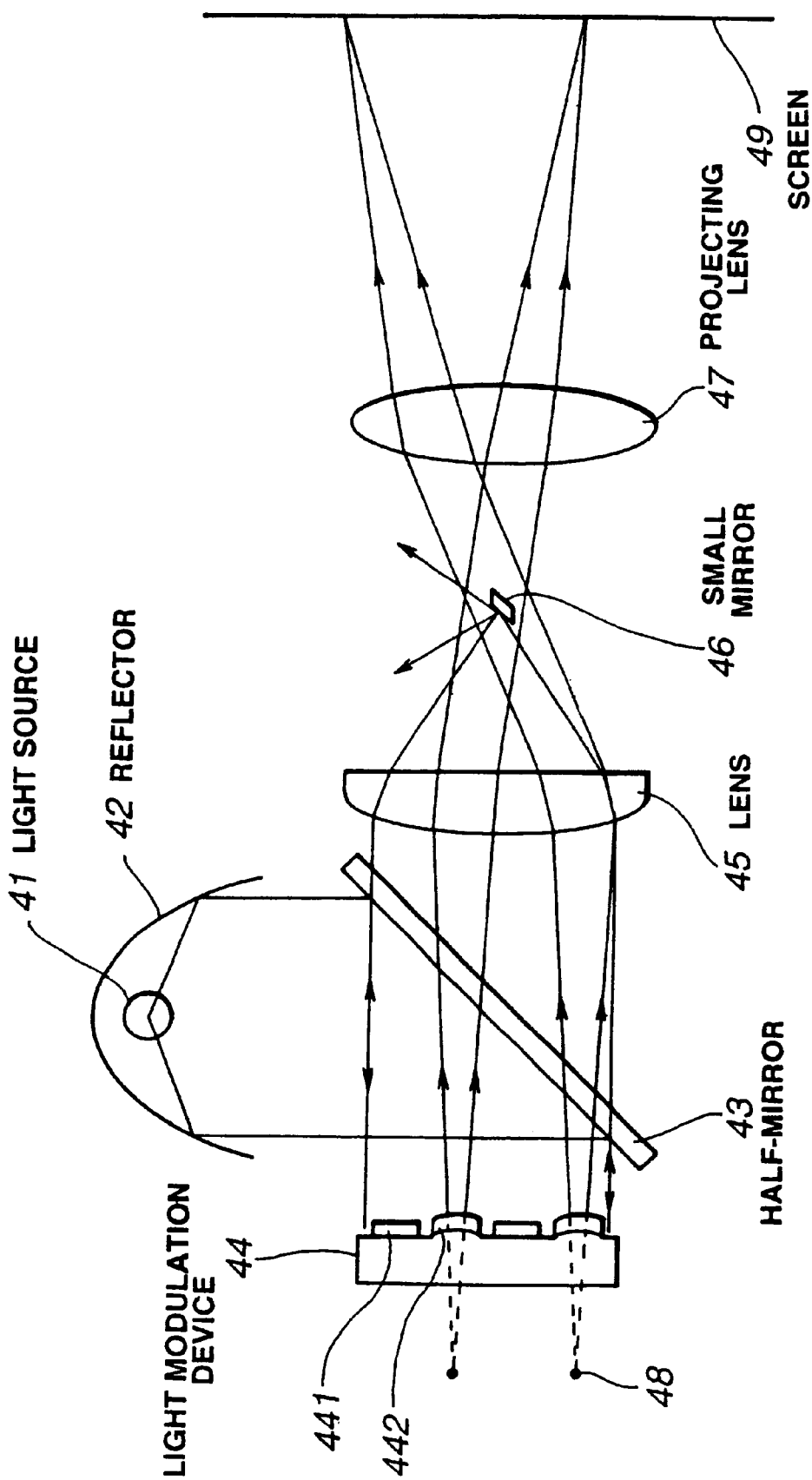

FIG.4A PATTERNING
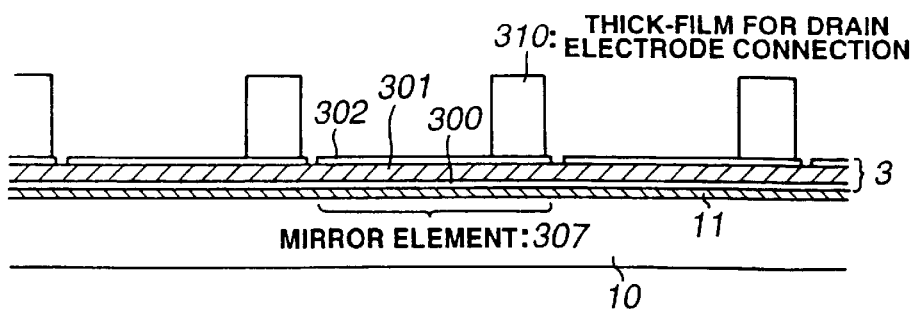
FIG.4B CONNECTION
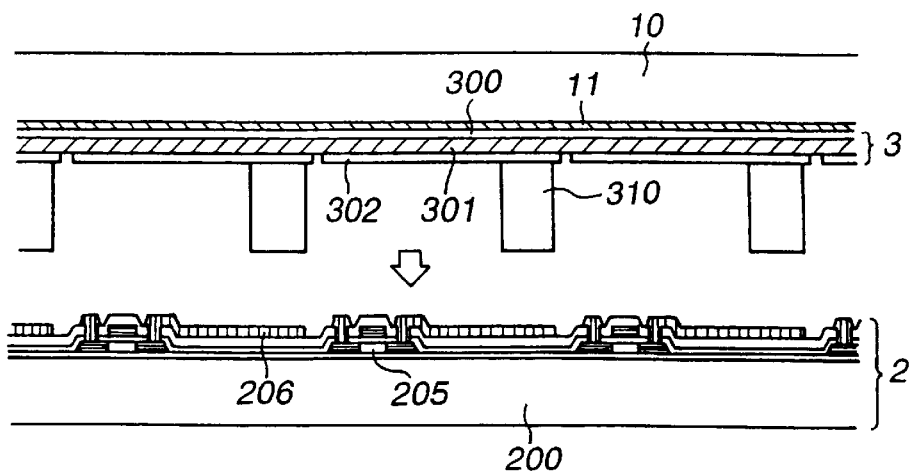

FIG.5A PATTERNING
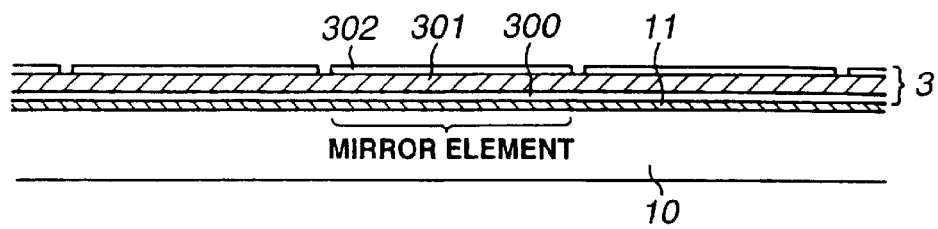
FIG.5B CONNECTION
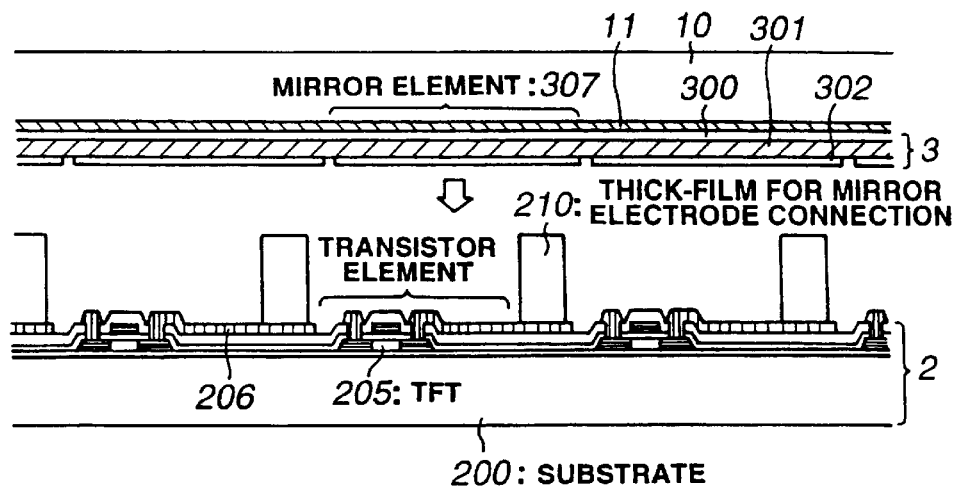

PROJECTOR AND METHOD OF MANUFACTURING A LIGHT MODULATION DEVICE

TECHNICAL FIELD

The present invention relates to a light modulation device that is employed in for example a projector and in particular relates to a method of manufacturing a light modulation device capable of preventing scattered reflection by reflecting mirrors.

BACKGROUND ART

Conventionally, light modulation devices in which light modulation is performed by means of reflecting mirrors are manufactured by mutually connecting together reflecting mirrors with an active element substrate. For example U.S. Pat. No. 441,791 discloses a method of manufacturing a reflecting mirror film and a light modulation device construction employing this reflecting mirror film. According to this reference, a reflective mirror film was manufactured by first of all forming a nitro-cellulose film by spreading on a water surface and lifting this off using a mesh screen then evaporating a metallic film onto it.

However, in this technique, since the reflecting mirror film is not formed on a hard substrate, it is difficult to stick a thin reflecting mirror film in a suitable position on the drive element substrate without physical deformation thereof. If the reflecting mirror film is stuck onto the drive element substrate whilst still in a slack condition, this results in the problem that the quantity of light that is reflected in unwanted directions when the irradiating light is modulated is increased, lowering the contrast between the modulated light and unmodulated light and lowering the utilisation rate of the light.

Also Early Japanese Patent Publication Number H. 6-301066 discloses a technique whereby a mirror array is provided on a glass substrate and, in addition, a resin layer is formed thereon, after which the resin layer is removed from the substrate for each element of the mirror array and an actuator substrate is stuck on. However, the technique disclosed in this reference is a technique wherein a light-reflecting film is stuck onto an actuator array. In order to drive the actuator array, an additional step is necessary for connecting a drive element substrate with the actuator array. This leads to the problem of complicating the process of manufacturing the light modulation device.

In order to avoid these problems it might appear that it would be desirable to manufacture a light modulation device by forming a reflecting mirror on a substrate such as silicon and then removing deformation portions of the reflecting mirror by etching etc. in the form of windows. That is, a light modulation device of a simple construction can be provided without forming the reflecting mirror in a slack configuration. With a light modulation device constructed in this way, the illuminating light that is necessary for display is directed onto the silicon substrate from the windows provided on the substrate, reflected by the reflecting mirror and again emitted from the windows.

However, although such a light modulation device has been devised, the problem arises that scattered reflection of light occurs, causing loss of brightness and/or contrast of the projected image.

With a construction in which windows are provided on the substrate, input and output of light are performed through the windows provided on the substrate so screening and/or scattered reflection of some of the reflected light are produced by the side walls of the windows. In order for handling in the manufacturing process to be carried out easily and safely, a certain film thickness (about 100 $\mu$m) is necessary on the substrate so the height of the side walls cannot be made indefinitely low i.e. the substrate cannot be made thin. Since the substrate needs to have a minimum thickness of about 100 $\mu$m, in the case of a light modulation device wherein the width of the windows is 50 $\mu$m, the side walls of the windows have a height of twice the width. Because of this a considerable proportion of the reflected light is screened and reflected by the side walls at the periphery of the reflecting mirrors, producing a so-called scattered reflecting condition. When an image is displayed using scattered reflected light, the amount of light is insufficient so the brightness of the projected image becomes insufficient and light from other pixels becomes admixed therewith, causing a drop in contrast.

DISCLOSURE OF THE INVENTION

A first object of the present invention is to provide a method of manufacturing a light modulation device whereby light modulation with a high rate of utilisation of the light can be achieved, by providing a step of forming a reflecting mirror such that there is no scattered reflection or sagging.

A second object of the present invention is to provide a projector whereby a projected image can be obtained which is bright with good contrast by providing reflecting mirrors with no scattered reflection and that can easily be deformed without sagging.

The invention for achieving the first object consists in a method of manufacturing a light modulation device comprising:

a) a step of forming a release layer whereby a release layer that produces separation in response to irradiation with incoming light is formed on a heat-resistant substrate having the capability of withstanding heat;

b) a step of forming a reflecting mirror layer whereby a reflecting mirror layer constituted so as to be capable of reflecting light is formed by a piezoelectric material(for example ferroelectric or ordinary dielectric piezoelectric ceramic) on the release layer formed by the release layer forming step;

c) a connection step of electrically connecting (for example the output of the active elements being connected to the second electrode thin-film), corresponding to pixel region units, the reflecting mirror layer that is laminated on the heat-resistant substrate with a active element substrate wherein active elements (for example thin-film transistors) are provided corresponding to pixel regions; and d) an irradiating separation step whereby said heat-resistant substrate is separated by producing separation in this release layer by irradiating the release layer with light from the side of the heat-resistant substrate.

It should be noted that the reflecting mirror layer could be formed with other layers apart from the piezoelectric layer. A construction in which a plurality of piezoelectric layers are laminated could also be provided.

For example the reflecting mirror layer forming step may comprise a step of forming a first electrode thin-film on the release layer; a step of forming a piezoelectric thin film on the first electrode thin-film; and a step of forming a second electrode thin-film on the piezoelectric thin-film. Preferably the first electrode thin-film is formed by optically reflective material. At least one film of the first electrode thin-film or second electrode thin-film may be formed of optically reflective material.

Also the step of forming the reflective mirror layer may further comprise a step of electrical isolation patterning (forming into squares, polygons or circles such as to effect isolation from the other electrodes), in units of pixel regions, this second electrode thin film and piezoelectric thin film, after the step of forming the second electrode thin film. Specifically, in the step of patterning the second electrode thin film and piezoelectric thin film this second electrode thin film and piezoelectric thin film may be patterned into polygons. Also the second electrode thin film and piezoelectric thin film may be patterned into circles.

Also the connection step may comprise: a step of providing electrodes for connection (for example dyke-shaped electrodes formed by patterning gold may be employed) on one or other of the active element substrate or reflecting mirror layer; and a step of electrically connecting the active element substrate and reflecting mirror layer by means of these connection electrodes. Specifically, in the connection step, the connection electrodes may be formed of gold.

A projector for achieving the second object consists in a projector comprising a light modulation device manufactured by the method of manufacture of the present invention, comprising:
  a) an illuminating optical system whereby illuminating light that has been made practically parallel is shone from a direction practically perpendicular to the light modulation device;
  b) a screening optical system that optically screens one or other of the reflected light from pixel regions driven by active elements in the light modulation device or pixel regions that are not driven; and
  c) a display optical system that forms a display image by imaging the light that has passed through the screening optical system.

BRIEF DESCRIPTION OF THE DRAWINGS

FIG. 1 illustrated a method of manufacturing a light modulation device according to a first embodiment of the present invention;

FIG. 3 is a constructional diagram of the optical system of a projector using a light modulation device according to the first embodiment;

FIG. 4 is part of a method of manufacturing a light modulation device according to a second embodiment of the present invention;

FIG. 5 is part of a method of manufacturing a light modulation device according to a third embodiment of the present invention.

BEST MODE FOR CARRYING OUT THE INVENTION

Figure 2:
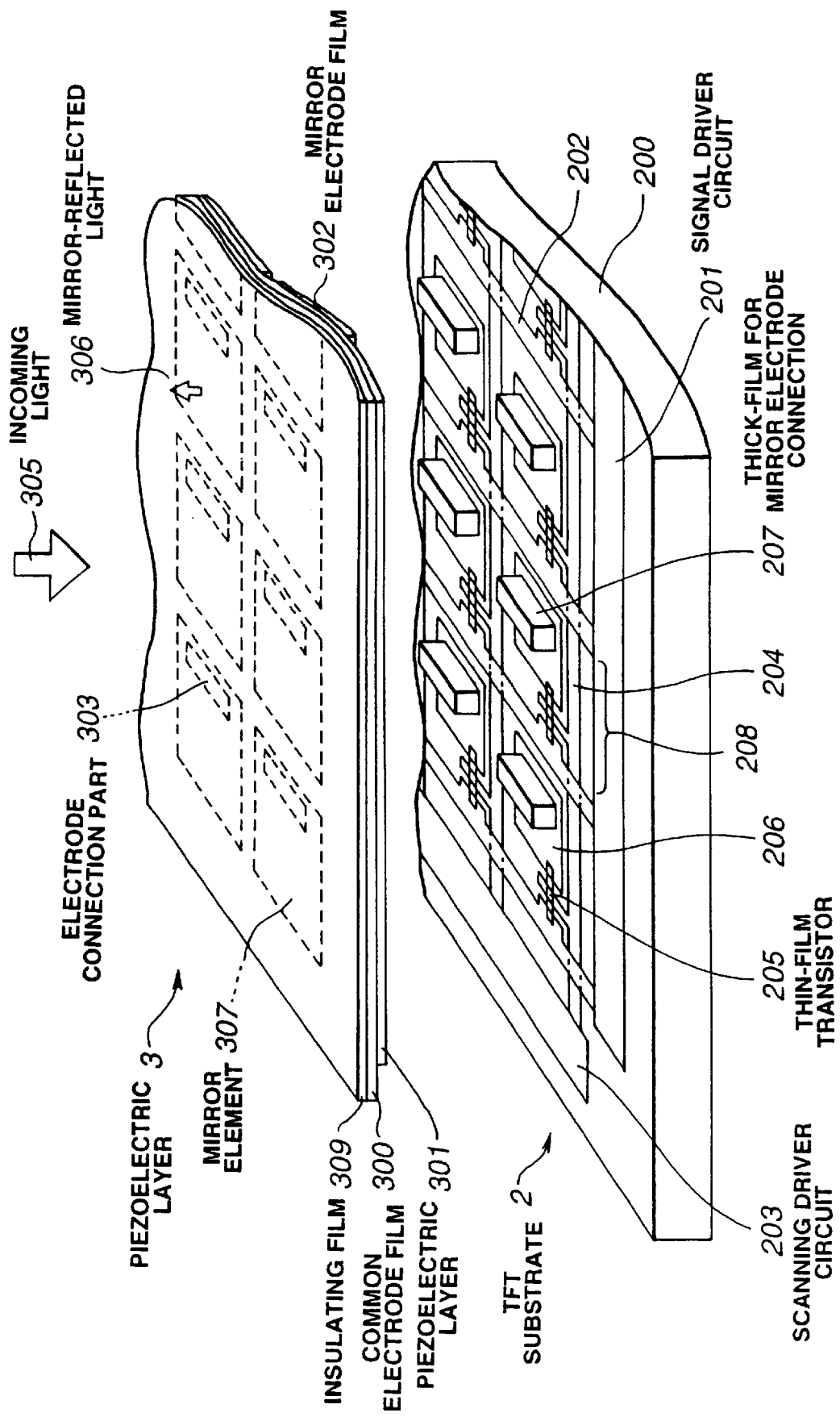
FIG. 2 is a perspective view of a light modulation device manufactured by the method of the first embodiment.

Next, preferred embodiments of the present invention are described below with reference to the drawings.
(First Embodiment)

A first embodiment of the present invention relates to a method of manufacturing a light modulation device employed in a projector whereby an image is projected onto a screen.

FIG. 1 shows constructional views of a substrate in steps of a method of manufacture according to the first embodiment. These constructional views are cross-sectional views of a manufacturing process showing a detail, to a larger scale, of a pixel of which a large number are formed on a single substrate.

Release layer forming step (FIG. 1A: first of all a release layer (light absorbent layer) 11 is formed on substrate 10. Substrate 10 is to be capable of transmitting through its interior light 12 (to be described) which is directed thereonto. The transmittance factor for the incoming light is preferably at least 10%. This is because if the transmittance factor is too low the attenuation of the incoming light is too great. Also substrate 10 must be a material that is capable of withstanding heat and possessed of high reliability in terms of strength. In this embodiment, the entire substrate must be left under a high-temperature environment in an annealing step (FIG. 1C), so it must be such as not to be denatured at this temperature. For these reasons, in this embodiment quartz glass is employed. The thickness of substrate 10 is about 0.1 mm~5 mm, preferably 0.5 mm~1.5 mm. This is because if the substrate is too thick, attenuation of the incoming light is too large, while if it is too thin the strength of the substrate is lowered.

Release layer 11 absorbs incoming light 12 and produces separation within this layer or at the interface thereof. Specifically release layer 11 is constituted of a material wherein separation is produced by ablation etc. provoked by loss or diminution of the coupling force between atoms or between molecules of its constituent material in response to light being directed onto it. As to the composition of such a release layer 11, amorphous silicon (a—Si) or polycrystalline silicon may be employed. This is because amorphous silicon is desirable as the material of the release layer since it withstands heat of about 900° C. in the heat annealing step of this embodiment yet shows high absorptivity in regard to certain incoming light. Apart from this, oxides and/or metals which are capable of being separated by energy concentration of incoming light can be employed as the material of the release layer. For example, with titanium oxide, depending on its film thickness, if its refractive index is sufficiently higher than the substrate constituted by the quartz, it appears that light can be trapped therein, enabling energy concentration to be produced. Thus it appears that titanium oxide can be employed as the material of a release layer if a release film can be formed in a thickness matching the wavelength of the incoming light so as to enable the light to be trapped.

The thickness of release layer 11 is preferably about 10 nm~20 μm, and even more preferably 40 nm~2 μm. The reason for this is that if the thickness of the release layer is made too thin the uniformity of the film thickness that is formed is lost, giving rise to irregularities in release, while if the thickness of the release layer is made too large the power (amount of light) of the incoming light needed to effect release must be made large or time is required to remove the residue of the release layer left behind after release has been effected.

Any suitable method of forming release layer 11 may be selected depending on conditions such as composition and thickness of the release layer, so long as it constitutes a method whereby a release layer can be formed with uniform thickness. In the case where the amorphous layer is composed of amorphous silicon, film deposition using the CVD method is desirable. For other compositions the ordinary thin film forming methods such as the sputtering method or evaporation method may be employed.

Although not shown in FIG. 1, an intermediate layer may be provided on top of release layer 11. The intermediate layer may be a protective layer that thermally insulates the transferred layer for example during manufacture or use and that functions as a barrier layer that prevents migration of constituents. The composition of this intermediate layer may be suitably selected in accordance with its purpose. For example in the case of an intermediate layer that is formed between a transferred layer and a release layer constituted of for example amorphous silicon, silicon oxide such as $SiO_2$ may be mentioned as an example. Other examples of intermediate layer composition that may be mentioned include metals such as Au, W, Ta, Mo, Cr, or Ti or alloys having these as main constituent. The thickness of the intermediate layer may be suitably selected in accordance with the purpose of its formation. Usually a thickness of about 10 nm~5 μm is desirable, about 40 nm~1 μm being even more desirable.

Regarding the method of forming the intermediate layer, the various methods described in connection with the release layer may be suitably employed. Apart from forming the intermediate layer by a single layer, it may be formed by two or more layers using a plurality of materials of the same or different composition. In FIG. 2, a transparent dielectric film 309 of silicon dioxide is provided as intermediate layer.

Formation of piezoelectric layer (FIG. 1B): A piezoelectric layer (reflective mirror layer) 3 that is constituted by laminating common electrode film 300 and piezoelectric film 301 is formed on release layer 11. In piezoelectric layer 3, mirror electrode film 302 is formed after the heat annealing step in order to prevent performance deterioration being caused by the heat annealing. Regarding the composition of common electrode 300, a metal such as for example Pt is desirable that has a high capability of withstanding heat in the manufacturing step, is electrically conductive and is little subject to change of characteristics with time.

As piezoelectric film 301, a material is used whose shape expands or contracts in response to application of voltage. Ferroelectric piezoelectric ceramics are preferred and for example lead zirconate titanate ($Pb(Zr,Ti)O_3$: PZT), lead lanthanum titanate (($Pb,La)TiO_3$), lead lanthanum zirconate (($Pb,La)ZrO_3$): PLZT), or lead magnesium niobate zirconate titanate ($Pb(Mg,Nb)(Zr,Ti)O_3$: PMN–PZT) etc. may be employed. As the method of forming the piezoelectric film, the sputtering method or sol-gel method may be employed. The thickness of the piezoelectric film may be altered depending on the magnitude of the volume change required but a piezoelectric film of thickness about 0.8 μm may be formed. Pattern formation of the common electrodes may be performed using known patterning techniques after formation of common electrode film 300.

Heat annealing step (FIG. 1C): Next, heat annealing treatment is performed in order to form a crystal structure that will function as a piezoelectric element. Piezoelectric layer 3 that is formed on substrate 10 is inserted into a furnace and the entire substrate is heated.

Patterning (FIG. 1D): After annealing treatment, a mirror electrode film 302 is formed on piezoelectric film 301. Regarding the composition of mirror electrode film 302, a material is desirable that is electrically conductive, whose characteristics change little over time, and that is capable of withstanding the heat in the manufacturing process. For example a metallic thin film of Pt, Ti, Al or Ag etc. may be employed.

Patterning in respect of mirror electrode film 302 is performed using a known patterning technique, such as for example photolithography. Specifically, the desired electrode pattern is formed by processing such as applying a resist, masking, exposure, development and etching. In this patterning step, the electrode portions that are left behind at each pixel become mirror elements 307 that constitute the reflecting mirrors. Mirror elements 307 constituting the reflecting mirrors are formed with a shape and area such as to be fully capable of reflecting incoming light. The electrode area of mirror elements 307 on the side nearest mirror electrode film 302 is patterned such as to be smaller than the electrode area on the side nearest common electrode film 300. After patterning mirror electrode film 302, polarisation treatment is performed in the direction perpendicular to the film by applying voltage to piezoelectric film 301.

The method of deforming mirror elements 307 will now be described. When drive voltage is applied to the piezoelectric film which has been subjected to polarisation treatment as described above, the piezoelectric film contracts in the plane in accordance with the direction of polarisation and the direction of the applied electric field. When this happens, common electrode film 300 is physically restrained by bumps 308, but mirror electrode film 302, with the exception of part thereof, is not restrained. Consequently, mirror elements 307 including the piezoelectric film are deformed so as to become upwardly convex in FIG. 1G.

After patterning mirror electrode film 302, bumps 308 are formed constituting electrical connecting elements that effect electrical connection with thick film 207 (to be described) for mirror electrode connection which is provided on the drain electrodes of thin-film transistors 205. Bumps 308 are formed in part of mirror elements 307. Bumps 308 are connected to the drains of the thin-film transistors over a very small area so they are preferably formed of a material such as gold (Au) whose connection resistance is small and whose surface is not easily oxidised. Also, in order to increase adhesion of bumps 308 and mirror electrode film 302, the gold bumps may be formed after forming a single layer of gold film on the mirror electrode film.

The distance between piezoelectric layer 3 and thin-film transistor substrate 2 must made a distance such that the heat that is produced by irradiation with incoming light 12 is not liable to be conducted to thin-film transistor 205. The height of bumps 308 from mirror electrode film 302 is therefore set such that the sum of this height and the height of thick-film 207 for connection of the mirror electrode satisfy this condition.

Connection step (FIG. 1E): next, thin-film transistor substrate 2 and the piezoelectric layer 3 formed on substrate 10 are electrically connected. Thin-film transistor (TFT) substrate 2 is provided with an array structure of thin-film transistors such as are frequently employed in ordinary liquid-crystal display devices. Its method of manufacture is also based on the conventional method. Specifically, thin-film transistor 205, signal driver 201, scanning driver circuit 203 and wirings 202, 204 are formed for each pixel of a glass or quartz substrate 200.

Furthermore, in the block of thin-film transistors (i.e. transistor elements) 208, thick-film 207 for connection of the mirror electrode that is electrically connected to bump 308 of piezoelectric layer 3 on drain electrode 206 of thin-film transistor 205 is formed in a thickness of about 2.0 μm by for example a plating method.

Thin-film transistor substrate 2 and piezoelectric layer 3 that is laminated on substrate 10 are mutually connected by press-fixing. Hot press-fixing is performed in a heated environment in order to ensure that press-fixing is performed reliably. Alloying of the joints between the bump 308 and thick-film 207 for connection of the mirror electrode is performed by press-fixing, reducing the connection resistance and enabling contact strength to be raised.

Irradiating step (FIG. 1F): Thin-film transistor substrate 2 and piezoelectric layer 3 are connected, and then light 12 is directed towards release layer 11 from the rear face of substrate 10. Light 12 passes through substrate 10 and is directed onto release layer 11 forming a spot 13. As a result, the coupling force between atoms or between molecules is reduced or eliminated at the interface between substrate 10 and release layer 11. It is inferred that, when irradiated with light 12, ablation occurs in the composition of release layer 11, or that discharge of gas, melting due to light 12, or phase change such as evaporation occurs within release layer 11.

Light 12 may be such as to efficiently produce intra-layer release in release layer 11, or interface release. In particular, laser light is preferred on account of the fact that it can easily produce ablation. For example, excimer laser light of wavelength 248 nm or 308 nm is employed. The type or wavelength of the laser light are decided after considering whether there is a wavelength dependence when ablation is produced in release layer 11 or whether separation is effected by gas discharge or phase change such as volatilisation or sublimation.

The energy density of the incoming laser beam in the case of an excimer laser beam is to be about 10~5000 mJ/cm$^2$ and the irradiation time is to be about 1~1000 nsec, preferably 10~100 nsec. If the energy density is too low or the irradiation time too short, sufficient ablation cannot be produced. On the other hand if the energy density is too high or the irradiation time is too long, apart from adverse effect on release layer 11 and piezoelectric layer 3, there is a risk of thin-film transistor 205 being destroyed. It is not necessary for the angle of incidence during irradiation to be perpendicular so long as irradiation with incoming light 12 is effected with uniform intensity. Also, in order to effect irradiation over the entire region of release layer 11, irradiation with the incoming light may be carried out a plurality of times or this may be shone on the same place two or more times. Furthermore, the type and wavelength of the laser light may be different depending on the region that is irradiated.

Separation step (FIG. 1G): Substrate 10 is separated at release layer 11 when force is applied such as to pull substrate 10 from piezoelectric layer 3 after irradiation with light. Residue adheres to release layer 11 on the side nearest common electrode layer 300 of piezoelectric layer 3, so this is removed by a method such as washing, etching, ashing, or polishing. Since the material that is used for substrate 1 that is separated is an expensive material such as quartz, it can be re-used for the manufacture of new light modulation devices.

FIG. 2 is a perspective view illustrating the construction of a light modulation device manufactured by the method of manufacture described above. In order to facilitate understanding of the construction, for convenience in description, piezoelectric layer 3 and thin-film transistor (TFT) substrate 2 are shown separated.

As shown in FIG. 2, the light modulation device of this embodiment has a construction wherein the piezoelectric layer 3 on which mirror element 307 is arranged and thin-film transistor substrate 2 on which the thin-film transistor element 208 that drives each mirror element are electrically connected.

Piezoelectric layer 3 is constituted by a common electrode film 300, piezoelectric film 301 and mirror electrode film 302 formed by the method of manufacture of this embodiment. Furthermore, FIG. 2 shows the case where there is provided a transparent dielectric film 309 that also provides the function of protecting piezoelectric layer 3 and that constitutes the intermediate layer of the separation step.

A signal driver circuit 201 and scanning driver circuit 203 are formed on thin-film transistor substrate 2. Signal driver circuit 201 is constituted so as to be capable of supplying switching signals based on ON/OFF information in the horizontal direction (X axis direction) of the image to the source of each thin-film transistor 205 through wiring 202. Scanning driver circuit 203 is constituted so as to be capable of supplying switching signals based on the ON/OFF information of the direction perpendicular to the image (direction of the Y axis) that is supplied from the display device, to the gates of each thin-film transistor 205 through wiring 204. The drive voltage that is generated in drain electrode 206 of thin-film transistor 205 is supplied to mirror electrode film 302 of each mirror element 307 through thick-film 207 for connection of the mirror electrode.

In the above construction of a light modulation device, when drive voltage is supplied from thin-film transistor 205, a potential difference is produced between mirror electrode film 302 of mirror element 307 corresponding to this and common electrode film 300 causing piezoelectric film 301 to contract in the direction within the surface and the mirror element to be deformed in the upwards direction of FIG. 2. Specifically, when drive voltage is supplied to a mirror element 307 its reflecting face forms a convex mirror whose focus is on the reverse side of mirror element 307. As a result the incoming light 305 that is directed onto it becomes a reflected beam 306 having light that is spread out by reflection by this convex mirror. In contrast, in the case of a mirror element 307 that is not supplied with drive voltage, its reflecting face is a plane mirror so reflected light 306 is reflected in parallel. Whether the mirror element is deformed in convex fashion or is deformed in concave fashion depends on the direction of polarisation of the piezoelectric film and the direction of the electrical field that is applied thereto. Consequently a projector employing the light modulation device in question must be constructed matching the mode of deformation of the light modulation device.

FIG. 3 is a cross-sectional view of a projector using a light modulation device (when deformed in convex fashion) manufactured by the method of manufacture of this embodiment. As shown in FIG. 4, the light that is emitted from a metal halide lamp constituting light source 41 is reflected by a reflector 42 having a parabolic face and is thereby converted into practically parallel rays, which are deflected by half-mirror 43 and directed onto a light modulation device 44 according to this embodiment.

In the case of a mirror element 441 of light modulation device 44 that is not supplied with drive voltage, the reflected beam 306 is parallel, so it is focused by lens 45 through half-mirror 43 and directed onto small mirror 46. Since the reflecting face of small mirror 46 has a fixed angle with respect to the optic axis, all the incoming light is reflected and does not reach screen 49. In contrast, in the case of a mirror 442 that is deformed by being supplied with drive voltage, the reflected beam 306 is turned into light radiating from focus 48 of the convex mirror.

Consequently, this light passes through lens 45, passes through the peripheral area of small mirror 46, and forms an image on screen 49 by means of projecting lens 47. Specifically, incoming light 305 is modulated in accordance with the image signal that is supplied to light modulation device 44 so that a display corresponding to the picture signal is produced on screen 49. Since no partition walls or substrate are then present in the face onto which the incoming light 305 is directed, there is no possibility of reflected light 306 being scattered so there is no possibility of the picture that is projected being dimmed or projected into the positions of other pixels.

As described above, with this first embodiment, since the piezoelectric layer is formed on the substrate with a release layer therebetween, there are no obstacles that can cut off the light, such as partition walls, in the face in the mirror element onto which the light is directed after the substrate has been separated at the release layer. Consequently, since there is no possibility of scattering by obstacles, the projected image can be made bright. Also, since there is no scattering by obstacles, there is no possibility of contrast being lowered. Also, since the heat annealing treatment of the piezoelectric layer can be performed prior to connection with the thin-film transistor substrate, there is no possibility of adverse effect on the thin-film transistors etc.

(Second Embodiment)

The second embodiment of the present invention proposes a method of patterning and a method of connection that are different from the first embodiment.

FIG. 4 shows part of a method of manufacturing a light modulation device according to this second embodiment. In this embodiment, from the release layer formation step (FIG. 1A) to the heat annealing step (FIG. 1C) and from the irradiation step (FIG. 1F) to the separation step (FIG. 1G) are the same as in the first embodiment so further description thereof is omitted.

Patterning step (FIG. 5D): Formation of the pattern on mirror electrode film 302 is the same as in the first embodiment. In order to effect electrical connection with the drain electrode of thin-film transistor 205 after patterning of mirror electrode film 302, thick-film 310 for connection of the drain electrode is formed in part of mirror element 307 instead of the bumps 308 of the first embodiment. Thick-film 310 for connection of the drain electrode is formed by a known technique such as plating. The metal for the plating should be a material with little contact resistance and whose surface is not easily oxidised, for example gold (Au) being preferable. The height of the thick-film 310 for connection of the drain electrode is equal to the distance (mentioned above) required between the piezoelectric layer 3 and thin-film transistor substrate 2.

Connection step (FIG. 4B): The drain electrode 206 of the transistor elements in the thin-film transistor substrate and the thick-film 310 for connection of the drain electrode formed on mirror electrode 302 are electrically connected. The thick-film 207 for connection of the mirror electrode in the first embodiment is not provided on thin-film transistor (TFT) substrate 2 used in this embodiment. Connection between thin-film transistor substrate 2 and the piezoelectric layer 3 laminated on substrate 10 is performed just as in the first embodiment. With this second embodiment, a light modulation device can be provided by a method of manufacture providing the benefits of the present invention even by providing a thick-film for connection to piezoelectric layer 3.

(Third Embodiment)

According to the third embodiment of the present invention, in contrast with the second embodiment, a thick-film for connection purposes is provided on the side of the thin-film transistor substrate.

FIG. 5 shows part of a method of manufacturing a light modulation device according to this third embodiment. In this embodiment, from the release layer formation step (FIG. 1A) to the heat annealing step (FIG. 1C) and from the irradiation step (FIG. 1F) to the separation step (FIG. 1G) are the same as in the first embodiment so further description thereof is omitted.

Patterning step (FIG. 5A): Formation of-the-pattern on mirror electrode film 302 is the same as in the first embodiment. That is, bumps 308 are not provided on mirror electrode 302 of mirror elements 307.

Connection step (FIG. 5B): In this embodiment, formation of thick-film 210 for connection of the mirror electrodes is effected for electrical connection with mirror elements 307 on drain electrodes 206 in transistor elements 205 of thin-film transistor substrate 2. The height of this thick-film 210 for connection of the mirror electrode is greater than that of thick-film 207 for connection of the mirror electrode of the first embodiment. This height is equal to the distance (mentioned above) required between the piezoelectric layer 3 and thin-film transistor substrate 2. The method of forming the thick-film is the same as in the case of the first embodiment. With this third embodiment, a light modulation device can be provided by a method of manufacture providing the benefits of the present invention even by providing a thick-film for connection only on the thin-film transistor substrate.

(Fourth Embodiment)

This relates to the construction of a projector employing a light modulation device in which deformation is effected to a concave shape instead of the display device employing a light modulation device in which deformation is effected to a convex shape shown in the first embodiment.

Figure 6:
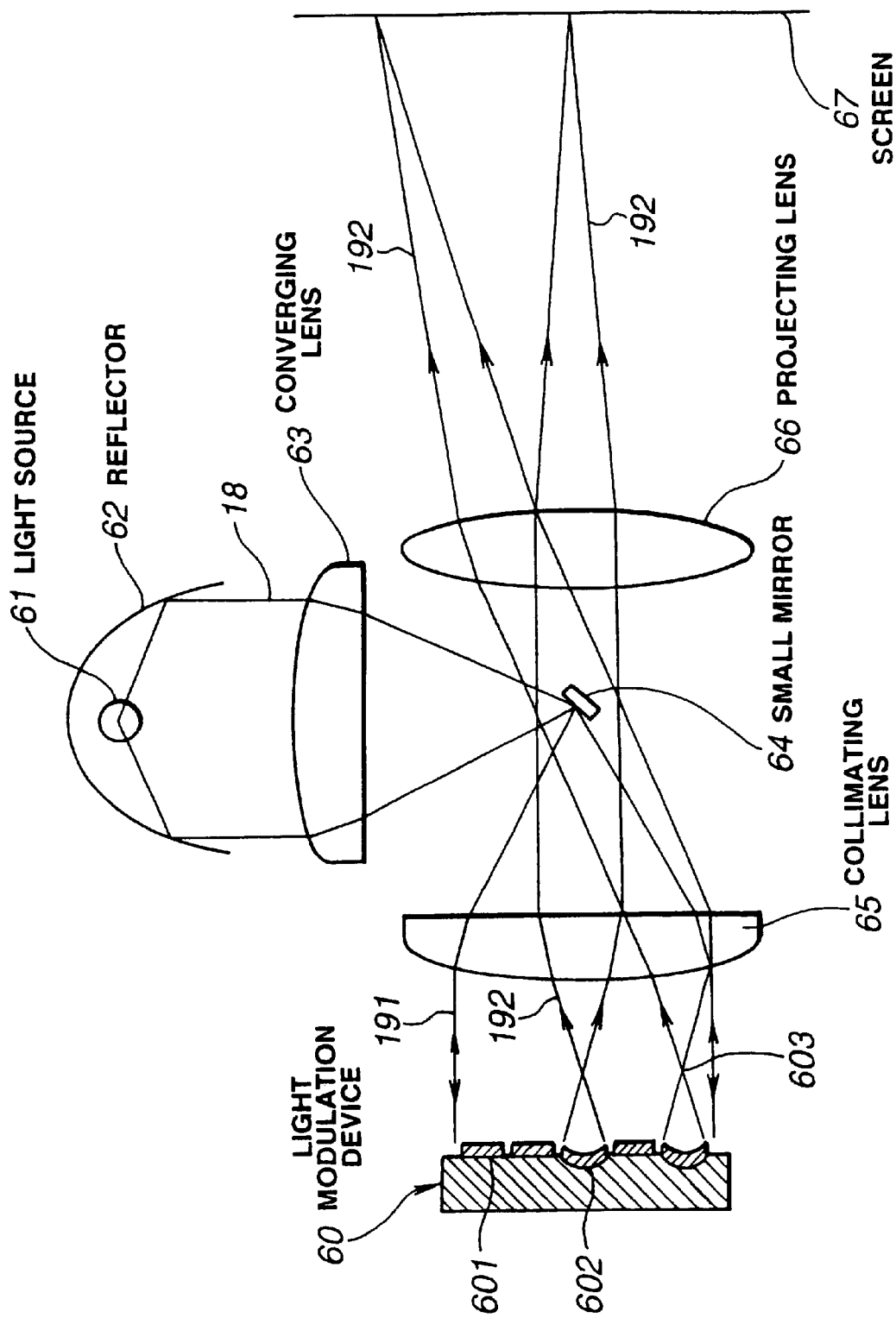
FIG. 6 is a constructional diagram of the optical system of a projector according to a fourth embodiment.

FIG. 6 is a cross-sectional view given in explanation of the construction of this projector. This Figure shows a cross-section sectioning the optical components along the optic axis of the incoming light. As shown in FIG. 6, the display device of this embodiment comprises a light modulation device 60, light source 61, reflector 62, converging lens 63, small mirror 64, collimating lens 65 and projection lens 66. For light modulation device, a light modulation device as manufactured in the first to third embodiments can be employed. However, a construction is required wherein the mirror elements are deformed in concave fashion as seen from the optical input side. In light modulation device 60, the reflecting faces are deformed in concave fashion by application of voltage. Consequently, the light that is reflected by a deformed mirror element 602 has a focal point 603 on the side nearest the collimating lens as seen from light modulation device 60.

Next, the light modulation action in a display device according to this embodiment will be described. The incoming light 18 emitted from light source 61 is reflected by reflector 62 and focused at the position of small mirror 64 by converging lens 63.

Since small mirror 64 is arranged inclined at 45° with respect to the optic axis, incoming light 18 diverges whilst it is directed onto collimating lens 65. Collimating lens 65 converts this incoming light 18 into parallel light which is directed perpendicularly to light modulation device 60. Since, of the mirror elements constituting light modulation device 60, mirrors 601 that are not deformed have flat reflecting faces, their reflected light 191 returns to collimating lens 65 still in the form of parallel light. This is then focused when it is reflected by small mirror 64 and so cannot reach projecting lens 66. This pixel is therefore not displayed on screen 67. The size of the reflecting face of small mirror 64 is the minimum size such that all the reflected light 191 from light modulation device 60 can be screened when all the mirror elements are undeformed so that they function as plane mirrors.

In contrast, deformed mirrors 602 function as concave mirrors, so their reflected light 192 passes through focus 603 and is input to collimating lens 65. This reflected light 192 is converted into practically parallel light by collimating lens 65; some of it is screened by small mirror 64 but the light that passes through the peripheral area of small mirror 64 reaches projecting lens 66 and forms an image on screen 67.

With the above construction, if all the mirror elements constituting light modulation device 60 are undeformed, all of the reflected light 191 is reflected by small mirror 64 and so fails to reach screen 67: the display of screen 67 is therefore black. In contrast, reflected light 192 from mirror elements 602 selected in accordance with a picture that is to be displayed is projected onto screen 67 and the picture is therefore displayed in white on a black background on screen 67.

Also, in order to perform colour display, as is known from the prior art, an arrangement may be adopted wherein a rotating disc-shaped filter, divided into three colours: red, green and blue is inserted between reflector 62 and converging lens 63; or an arrangement may be adopted wherein respective red, green and blue colour filter layers are formed on the surface of the--mirror elements constituting light modulation device 60.

Depending on the function of projecting lens 66, various display devices may be constructed such as projection displays or video camera view-finders or head-mounted displays.

As described above, with this fourth embodiment, a bright projected picture with good contrast is obtained thanks to the provision of a light modulation device according to the present invention wherein there is no scattered reflection and the rate of utilisation of the light is high, and wherein there are no elements such as half-mirrors that would attenuate the light.

(Other Modified Examples)

The present invention may be applied modified in various ways without being restricted to the embodiments of the invention described above. For example, regarding the construction, composition and thickness of the piezoelectric film, this could be formed in other constructions etc. without being restricted to the embodiments described above. Whether or not to form a transparent dielectric film that also serves as intermediate layer in protection and release of the piezoelectric layer can be determined at will in accordance with the properties of the piezoelectric material. It should be noted that the transparent protective film of the common electrode film can be formed again after the step of separating the substrate has been completed.

Also, regarding the shape of the mirror elements 307, apart from the square shape shown in FIG. 2, various shapes may be considered such as polygonal, circular or elliptical.

Specifically, the electrode shape may be altered by patterning the electrodes by masking so as to produce any desired electrode shape.

Furthermore, as the arrangement of mirror elements 307, apart from the two-dimensional arrangement shown in FIG. 2, a one-dimensional arrangement could be adopted in which the mirror elements are arranged in a row.

Furthermore, regarding the optical arrangement of the projector device, the present invention could be applied to any arrangement whereby a picture can be projected using reflected light in which the condition of the light is different depending on whether the pixel is active or inactive.

INDUSTRIAL APPLICABILITY

With the method of manufacturing a light modulation device according to the present invention, since the substrate that constitutes the foundation when the reflecting mirror layer is formed is separated so that only the reflecting mirror layer is left, a light modulation device can be manufactured without the screening and scattered reflection of reflected light that would occur if a substrate were provided. Also, since formation of the reflecting mirrors is performed on a substrate, reflecting mirrors can be formed such that sagging is not produced in the mirror surface under steady-state conditions. Also, a light modulation device of high pixel density can be manufactured since the substrate such as to prevent deformation of the reflecting mirrors is separated. A light modulation device manufactured by this method of manufacture has a high rate of utilisation of the light and with a projector using this light modulation device a bright projected image of high contrast can be obtained.

Also, with the method of manufacturing a light modulation device according to the present invention, a release layer and reflective mirror layer are formed on a heat-resistant substrate having heat-resisting ability, a pattern is formed in respect of the reflecting mirror layer, and the active element substrate and reflecting mirror layer are connected, after which, by an irradiating separation step, the heat-resistant substrate is separated by inducing separation in the release layer.

Consequently, by these steps, a light modulation device can be manufactured without adverse effect being produced by the heat of forming the reflecting mirror layer on the active element substrate.

With a projector according to the present invention, reflecting mirrors are provided wherein there is no scattered reflection and which are easily deformed without sagging, so a projected picture can be obtained that is bright with good contrast.

What is claimed is:

1. A method of manufacturing a light modulation device comprising the steps of:
   forming a release layer on a front side of a heat-resistant substrate;
   forming a reflective mirror layer on the release layer, said reflecting mirror layer comprising piezoelectric material;
   electrically connecting said reflecting mirror layer to an active element substrate at a plurality of pixel regions, whereby active elements are provided at each pixel region;
   irradiating said release layer with light from a rear side of said heat-resistant substrate to reduce a coupling force of the release layer; and
   removing said heat-resistant substrate from said reflecting mirror layer.

2. The method of manufacturing a light modulation device according to claim 1, wherein said step of forming a reflective mirror layer comprises a step of forming a first electrode thin film on said release layer; a step of forming a piezoelectric thin film on said first electrode thin film; and a step of forming a second electrode thin film on said piezoelectric thin film.

3. The method of manufacturing a light modulation device according to claim 2, wherein at least one electrode thin film of said first electrode thin film or said second electrode thin film is formed by optically reflective material.

4. The method of manufacturing a light modulation device according to claim 2, wherein said reflecting mirror layer forming step comprises a step of patterning by electrically isolating said second electrode thin film and said piezoelectric thin film in pixel regions after the step of forming said second electrode thin film.

5. The method of manufacturing a light modulation device according to claim 4, wherein, in the step of patterning said second electrode thin film and said piezoelectric thin film, said second electrode thin film is patterned into polygons.

6. The method of manufacturing a light modulation device according to claim 4, wherein, in the step of patterning said second electrode thin film and said piezoelectric thin film, said second electrode thin film is patterned into circles.

7. The method of manufacturing a light modulation device according to claim 1, wherein said connection step comprises a step of providing electrodes for connection on said active element substrate or said reflecting mirror layer; and a step of electrically connecting said active element substrate and said reflecting mirror layer by said connection electrodes.

8. The method of manufacturing a light modulation device according to claim 1, wherein said connection step comprises a step of providing electrodes for connection on both of said active element substrate and said reflecting mirror layer; and a step of mutually electrically connecting said active element substrate and said reflecting mirror layer by said connection electrodes.

9. The method of manufacturing a light modulation device according to claim 7, wherein in said connection step said connection electrodes are formed of gold.

10. A projector comprising a light modulation device manufactured by the method of manufacture of claim 1, comprising:

an illuminating optical system whereby illuminating light that has been made practically parallel is shone from a direction practically perpendicular to said light modulation device;

a screening optical system that optically screens one or other of the reflected light from pixel regions driven by said active elements in said light modulation device or pixel regions that are not driven; and a display optical system that forms a display image by imaging the light that has passed through said screening optical system.

11. The method of manufacturing a light modulation device according to claim 1, wherein the thickness of said release layer is about 10 nm–20 $\mu$m.

12. The method of manufacturing a light modulation device according to claim 1, wherein the thickness of said release layer is 40 nm–2 $\mu$m.

13. The method of manufacturing a light modulation device according to claim 1, wherein said release layer comprises amorphous silicon or polycrystalline silicon.

* * * * *